United States Patent [19]

Radeloff et al.

[11] 4,002,507

[45] Jan. 11, 1977

[54] NIOBIUM-FREE SEMI-HARD MAGNETIC GLASS SEALABLE ALLOY SYSTEM OF COBALT- (NICKEL, ALUMINUM, TITANIUM)- IRON

[75] Inventors: Christian Radeloff, Bruchkobel; Horst Herrmann, Hanau, both of Germany

[73] Assignee: Vacuumschmelze GmbH, Germany

[22] Filed: July 1, 1975

[21] Appl. No.: 592,242

[30] Foreign Application Priority Data

July 3, 1974 Germany .......................... 2431874

[52] U.S. Cl. .......................... 148/31.55; 75/123 K; 148/120; 148/121

[51] Int. Cl.[2] .......................................... C04B 35/00

[58] Field of Search .............. 148/31.55, 120, 121; 75/170, 123 K

[56] References Cited

UNITED STATES PATENTS

| | | | |
|---|---|---|---|
| 3,574,003 | 4/1971 | Nara et al. | 148/31.55 |
| 3,615,910 | 10/1971 | Tomita et al. | 148/31.55 |
| 3,719,474 | 3/1973 | Bieber et al. | 75/123 K |

*Primary Examiner*—Walter R. Satterfield
*Attorney, Agent, or Firm*—Hill, Gross, Simpson, Van Santen, Steadman, Chiara & Simpson

[57] ABSTRACT

A solid, semi-hard magnetic alloy adapted to be sealable in glass in the system cobalt-(nickel, aluminum, titanium) - iron. The alloy is intermediately annealed, cold worked by at least 70%, and subjected to a final annealing. The alloy can be sealed in glass and displays magnetic and physical property characteristics making it suitable for the fabrication of storage apparatus and switching elements.

5 Claims, 1 Drawing Figure

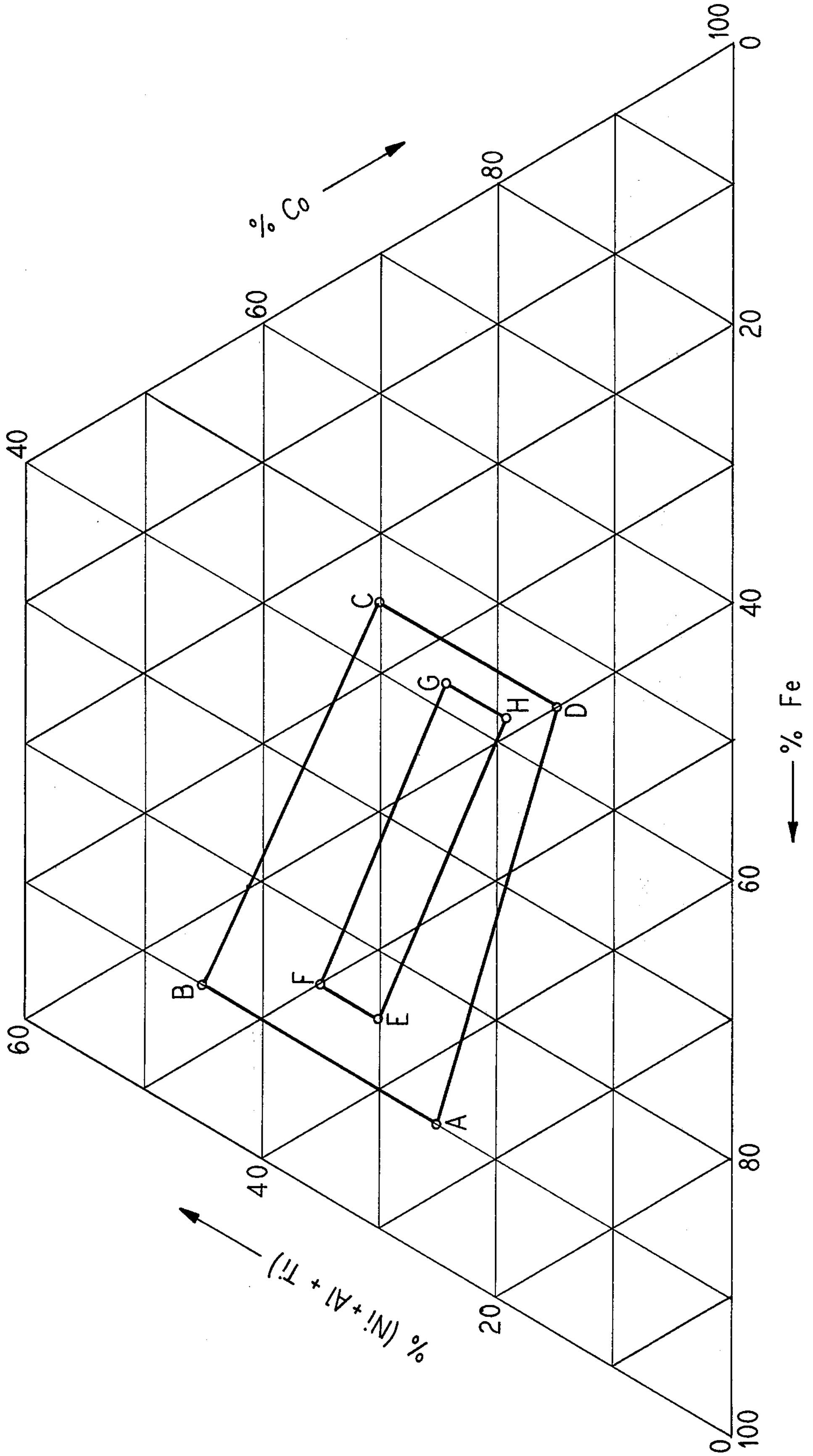
% Co
% Fe
% (Ni+Al+Ti)
100
0
80
60
40
20
A
B
C
D
E
F
G
H

NIOBIUM-FREE SEMI-HARD MAGNETIC GLASS SEALABLE ALLOY SYSTEM OF COBALT-(NICKEL, ALUMINUM, TITANIUM)- IRON

BACKGROUND OF THE INVENTION

For the fabrication of storage apparatus and switching elements, as, for example, bistable remanent reed relays, materials are required which have a coercive force $H_c$ of 20 to 80 Amperes per centimeter, a remanence ratio $J_r/J_s$ of at least 0.80, as well as a remanence flux density $B_r = J_r$ of at least 1.2 Tesla, and which are, in addition, distinguished by their good sealability in suitable glasses. These materials, furthermore, should still be conveniently deformable in a hard state, and should exhibit a relatively high elasticity under magnetically favorable conditions. In addition, they should have a relatively low saturation magnetostriction λ s.

In order to meet these magnetic, thermo-mechanical, and related technological needs, the use of magnetic semi-hard alloys has been proposed, such as a cobalt-iron-nickel-niobium-alloy, which, additionally, can contain at least one metal from the group tantalum, titanium, vanadium, zirconium, molybdenum, chromium, and tungsten (German "Auslegeschrift" No. 2,244,925). In this alloy, the weight ratio of cobalt to iron is in the range from 3 :2 to 1 : 2, the weight ratio of nickel to iron is in the range from 1 : 1 to 1 : 3, and the portion of niobium, or of niobium plus an additional metal, is 1 to 5 weight percent. For the use contemplated, this alloy is hardened at 600° to 900° C, and subsequently cold deformed by at least 75% with intermediate annealings at temperatures of at least 600° C. Note: 1 Ampere per centimeter ≙ 1.256 Oerstedt, and 1 Telsa ≙ 1 Volt-sec. per square metre ≙ 10,000 Gauss.

However, such cobalt-iron-nickel-niobium-alloy only poorly satisfied the need for a high metal-glass-adhesive strength which bond strength constitutes a significant prerequisite for good sealability. A further disadvantage is that this alloy requires the presence of niobium which is a relatively expensive metal, whose melting point is nearly 1000° C over that of the remaining alloy components.

Thus, there is needed a niobium-free alloy, which satisfies the needs indicated above for materials useful in storage apparatus and circuit (switching) elements both from a magnetic as well as from mechanical and related technological viewpoints.

BRIEF SUMMARY OF THE INVENTION

Contrary to the prior art teachings that a minimum content of niobium is indispensable in magnetic cobalt iron nickel alloys in order to achieve a desirably high coercive force (see German "Auslegeschrift" No. 2,244,925, column 3, lines 1 through 23), it has now been surprisingly and unexpectedly discovered that niobium free cobalt-nickel-iron alloys can achieve a desired high level of magnetic characteristics if the elements aluminum and titanium in specific proportions are included in the alloy, and the alloy, following melt fusion and preliminary working, is subjected to a large cold deformation operation as well as a terminal heat annealing treatment. In contrast to the known niobium-containing prior art alloys, the alloys prepared according to the present invention are further distinguished by their substantially increased metal-glass adhesive strength.

More particularly, the present invention is described to a solid, semi-hard, magnetic alloy adapted to be sealable in glass comprising a multi-component system of cobalt-(nickel, aluminum, titanium) - iron. In this system, on a 100 weight percent total basis, the amount of cobalt ranges from about 10 to 45 weight percent, the amount of iron ranges from about 25 to 65 weight percent, and the total amount of nickel, aluminum and titanium range from about 15 to 45 weight percent. Furthermore, on the same 100 weight percent total weight basis, such alloy contains an amount of nickel ranging from about 10 to 40 weight percent, an amount of aluminum ranging from about 1 to 4 weight percent, and an amount of titanium ranging from about 0.5 to 4 weight percent. The sum of aluminum and titanium ranges from about 2 to 5 weight percent.

Such an alloy is prepared by the steps of sequentially first melt fusing the starting metals at a temperature ranging from about 1500° to 560° C. Next, one preliminarily anneals the product alloy at temperatures ranging from about 700° to 900° C. Thereafter, one cold deforms the alloy by at least about 70% (based on cross-section). Finally, one anneals the so deformed alloy at temperatures from about 500° to 700° C for a time of from about 1 to 3 hours.

BRIEF DESCRIPTION OF TE DRAWING

For a better understanding of the invention, reference is made to the accompanying drawing in which:

FIG. 1 is a composition diagram illustrating the relationship between cobalt, iron, and (nickel, aluminum and titanium) in alloys of the present invention.

DETAILED DESCRIPTION

Alloys of the present invention are further defined by reference to FIG. 1 wherein the polygonal region ABCD is shown. Such region ABCD is delimited by the polygonal course A (10 % Co; 25 % (Ni+Al+Ti); 65 % Fe) —
B (10 % Co; 45% (Ni+Al+Ti); 45 % Fe) —
C (45 % Co; 30 % (Ni+Al+Ti); 25 % Fe) —
D (45 % Co; 15 % (Ni+Al+Ti); 40 % Fe) — A, Preferred alloys of the present invention comprise those wherein on a 100 weight percent total basis the amount of cobalt ranges from about 15 to 42 weight percent, the amount of iron ranges from about 34 to 55 weight percent, and the total amount of nickel, aluminum, and titanium ranges from about 19 to 35 weight percent. In such preferred alloys, and on the same total 100 weight percent basis, the amount of nickel ranges from about 15 to 31 weight percent, the amount of aluminum ranges from about 1 to 3 weight percent, and the amount of titanium ranges from about 1 to 3 weight percent. The sum of aluminum and titanium therein ranges from about 3 to 4 weight percent. Such preferred alloys are further defined by the polygonal region EFGH of FIG. 1 which region is delimited by the polygonal course E (15 % Co; 30 % (Ni+Al+Ti); 55 % Fe) —
F (15 % Co; 35 % (Ni+Al+Ti); 50 % Fe) —
G (42 % Co; 24 % (Ni+Al+Ti); 34 % Fe) —
H (42 % Co; 19 % (Ni+Al+Ti);39 % Fe) — E.

As indicated above, alloys of the present invention are prepared by following the indicated sequence of steps. Preferably, the preliminary annealing is conducted in a time interval ranging from about 0.5 to 4 hours. More preferably, the preliminary annealing is conducted within temperatures ranging from about 700° to 900° C using times ranging from about 1 to 3 hours.

Following preparation of an alloy by melt fusion using conventional techniques and equipment, the molten alloy is typically cast into an ingot of desired size and shape. After cooling, the ingot is typically subjected to forging operations of any desired character, forging usually being carried out at temperatures estimated to range from about 1000° to 1200° C. More than one type of forging operation may be performed on a given ingot, as those skilled in the art will readily appreciate. For example, an ingot can first be hammered by any suitable means into a billet and then the billet can be hot rolled into a desired shape. For example, a billet may be formed into a bar by hot rolling, or into a sheet.

After such forging, the product shaped alloy, in whatever form, is subjected to a preliminary annealing operation using conditions as hereinabove indicated generally. Thereafter, the product annealed shapes are preferably pickled in a conventional pickling bath such as one of the sulfuric acid type.

Thereafter the shaped bodies are then cold worked (deformed) to an extent such that the original body shape is altered (e.g. expanded) in at least one direction by 70% by cross-section relative to the starting configuration. Such cold working can be performed by any conventional metallurgical processing technique including cold rolling, cold drawing through dies, and the like, as those skilled in the art will appreciate.

Thereafter, the cold worked shape is then subjected to a final annealing using temperatures and times as above indicated. In one preferred set of processing conditions, final annealing temperatures range from about 500° to 700° for times of from about 0.5 to 4 hours.

In one preferred product form, an alloy of this invention is in the physical form of a wire whose cross section is circular and whose diameter falls in the range of from about 0.1 to 20 mm.

In general, an alloy of this invention is characterized by having a coercive force of from about 20 to 80 Amperes per centimeter, a remanence rato of from about 0.75 to 0.95, a remanence flux density of from about 1.2 to 1.6, and a saturation flux density of from about 1.5 to 1.7 Tesla.

The alloys of this invention can be sealed in glasses, with fit thermal expansion coefficient.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLES 11 5

Each of five alloys of the present invention, and one alloy of the prior art, are prepared by melting mixtures of high purity starting metals at temperatures estimated to be in the range from about 1500° to 1560° C in vacuo by using an alumina crucible disposed in an electric induction furnace. The molten metal is agitated to produce a homogeneous melt of the alloys, which melt is then poured into a metallic mold having inside dimensions of about 30 mm in diameter about 120 mm in length.

The composition of each alloy is shown below in Table 1.

TABLE I

Alloys having a cobalt-nickel-iron base

| Alloy Example Number | Alloy Composition (100 weight percent basis) Co | Fe* | Ni | Al | Ti | Nb |
|---|---|---|---|---|---|---|
| 1 | 14.70 | remainder | 28.60 | 2.88 | 1.08 | 0 |
| 2 | 23.40 | remainder | 25.00 | 3.10 | 1.20 | 0 |
| 3 | 38.85 | remainder | 18.75 | 2.80 | 1.10 | 0 |
| 4 | 40.00 | remainder | 16.20 | 3.12 | 1.19 | 0 |
| 5 | 40.00 | remainder | 16.25 | 1.01 | 3.28 | 0 |
| 6 | 40.05 | remainder | 16.15 | 0 | 0 | 3.73 |

*Percentage includes the customary impurities dependent on the melting process. However, the total proportion of deoxidation and desulphurization elements present in any given alloy is less than 1% by weight. The term "remainder" designates balance up to 100 weight percent of alloy.

Each ingot thus obtained is forged at about 1150° C into a bar whose dimensions are about 12 × 12 × 600 m. Each resulting such bar is hot rolled at about 1000° C into a rod with a cross-section of about 5.4 × 5.4 mm. These rods are each then given a preliminary annealing at temperatures in the range of about 700° to 900° C for a time of from about 2 to 4 hours. The annealed rods are then pickled in a sulfuric acid pickling bath. Each rod is then cold deformed by means of drawing through wire forming dies which result in deforming the thickness of each rod by about 67, 70, 87, 90, 95 or 97% to form wires whose diameters are, respectively, 3.3; 3.1; 2.0; 1.8; 1.3; or 1.0 mm. Thereafter, the product wires each then subjected to a final annealing at temperatures ranging from about 500° to 700° C for a time of about 2 hours.

From each wire finished in this manner, 100 mm sample lengths are prepared to evaluate the influence of the final heat treatment on magnetic, mechanical and related physical characteristics. Also, the glass adhesive strength is determined according to the method according to the Journal "Glastechnische Berichte", 46 (1973), pages 153 to 155, in the case of two alloys to be used according to the invention (Nos. 4 and 5) and in the case of the alloy according the state of the art (No. 6).

The results are shown below in Tables II and III.

TABLE II

Characteristic Values of alloys having a cobalt-nickel-iron base, dependent on cold working and final heat treatment.

| Alloy No. | Cold % | Final Annealing Temperature (° C) | Time (hours) | Coercive Force (1) | Remanence (2) | Remanence Flux Density (3) | Saturation Flux Density (4) | Vickers hardness (in hard state) (5) |
|---|---|---|---|---|---|---|---|---|
| 1 | 95 | 550 | 2 | 65 | 0.88 | 1.32 | 1.50 | 440 |
| 2 | 70 | 600 | 2 | 70 | 0.84 | 1.30 | 1.55 | 380 |
| 2 | 90 | 600 | 2 | 80 | 0.85 | 1.32 | 1.55 | 460 |
| 3 | 95 | 550 | 2 | 50 | 0.92 | 1.58 | 1.70 | 545 |
| 3 | 95 | 650 | 2 | 42 | 0.86 | 1.45 | 1.68 | 545 |

TABLE II-continued

Characteristic Values of alloys having a cobalt-nickel-iron base, dependent on cold working and final heat treatment.

| Alloy No. | Cold % | Final Annealing Temperature (° C) | Time (hours) | Coercive Force (1) | Remanence (2) | Remanence Flux Density (3) | Saturation Flux Density (4) | Vickers hardness (in hard state) (5) |
|---|---|---|---|---|---|---|---|---|
| 4 | 97 | 550 | 2 | 40 | 0.90 | 1.48 | 1.66 | 480 |
| 4 | 97 | 650 | 2 | 36 | 0.89 | 1.46 | 1.64 | 480 |
| 4 | 87 | 650 | 2 | 28 | 0.80 | 1.31 | 1.64 | |
| 4 | 67 | 650 | 2 | 30 | 0.76 | 1.22 | 1.60 | |
| 4 | 97 | 750 | 2 | 10 | 0.74 | 1.18 | 1.64 | 480 |
| 5 | 95 | 500 | 2 | 52 | 0.86 | 1.42 | 1.65 | 485 |
| 6 | 97 | 600 | 2 | 19 | 0.80 | 1.25 | 1.56 | 490 |

1. Coercive Force is measured in Amperes per centimeter (1 Amp/cm ≙ 1.256 Oersteds)
2. Remanence ratio is here defined to be the ratio of Remanence Flux density to Saturation Flux density. (Applied magnetic field to saturate :2000 Amps/cm)
3. Remanence Flux density is measured in Tesla (1 Tesla ≙ $1 V_s/_m 2$ ≙ 10,000 Gauss)
4. Saturation Flux density is measured in Tesla and is here defined by $]_s = B - \mu_o H$ (Applied magnetic field : 2000 Amps/cm)
5. Vickers hardness equals applied load in kilograms divided by the area of the pyramidal impression. Here the applied load is 5 kilograms applied perpendicular to the cross-section of tested wires. The wires are cold deformed according to column 2.

From the physical characteristics shown in Table II, it is evident that, in the case of the alloys Nos. 1 to 5, on the one hand, a too low cold deforming (less than about 70%), and, on the other hand, an excessively high final annealing temperature (e.g. above about 750° C), leads to a remanence ratio which is under the desired value of at least about 0.80. Moreover, such an excessive final annealing temperature (e.g. above about 750° C) results in an insufficient coercive force (10 A/cm) and a low remanence ratio which is undesirably low (e.g. about 0.74). On the other hand, if the method steps used for achieving a magnetic semi-hard state are carried out according to the present invention, the resulting magnetic characteristic quantities of the cobalt-nickel-iron-aluminum-titanium alloys lie in desired value zones, and they exceed the corresponding characteristic values of the cobalt-iron-nickel-niobium-alloy whose compositin is according to the state of the art (No. 6 particularly as regards coercive force. These results further show that, under the same fabrication conditions, the alloys containing less cobalt (Nos. 1 and 2), on the one hand, attain a higher coercive force than do the alloys containing more cobalt (Nos. 3, 4 and 5) on the other hand. However, such alloys containing less cobalt [(Nos. 1 and 2)] exhibit lower remanence flux densities. For the desired value zones, the data in Table II also indicate an operating rule for specific selection of particular alloys provided according to the present invention.

TABLE III

Glass Adhesion Characteristics of Alloys Having a Cobalt-Nickel-Iron-Base Dependent on Oxidation Treatment.*

| Alloy Number | Oxidation treatment Temperature ° C | Oxidation treatment Time (Minutes) | Glass Adhesion (mg/cm²) | Remark |
|---|---|---|---|---|
| 4 | 900 | 1 | 6.5 | |
| 4 | 900 | 3 | 14.5 | |
| 5 | 900 | 1 | 4.5 | |
| 5 | 900 | 3 | 7.5 | |
| 6 | 900 | 1 | −2.8 | Oxide layer Lamellar (flaky) |
| 6 | 900 | 3 | −1.8 | Oxide layer Lamellar (flaky) |

Table III Footnote:
*Short description of the method for determining the adhesionstrength ("Glastechnische Berichte", 46 (1973), pages 153 to 155).

A rod of 200 mm in length and about 2 mm in diameter is to be oxidized in air (temperature and time see column 2 and 3) and has to be weighted afterwards. Subsequently a layer of glass is melted around the rod which has to be extended for some percent after cooling down. Thus the glass gets cracks and bursts off more or less, depending on the adhesion strength. The strongly adhering rests of the glass increase the weight of the rod. This stated increase is given in the column "Glass adhesion" as a measure for the adhesion strength. Negative values will turn up, if both the glass and parts of the oxide are bursting of; they indicate a poor adhesion strength.

From the measured values reproduced in Table III, it is evident that the alloys of this invention have excellent glass adhesion characteristics compared to the prior art.

As a consequence of their favorable magnetic and physical property features, in particular their great coercive force, their high remanence ratio, and their excellent glass adhesion, the alloys of Examples 1–5 are well suited for use as materials in storage apparatus and switching elements. Such alloys make possible a simplified construction of such apparatus, as well as a high operational security.

We claim:

1. A solid, semi-hard, magnetic heat-treated and worked alloy adapted to be sealable in glass consisting essentially of a multicomponent system of cobalt-(nickel, aluminum, titanium) - iron wherein on a 100 weight percent basis the amount of cobalt ranges from about 10 to 45 weight percent, the amount of iron ranges from about 25 to 65 weight percent, and the total amount of nickel, aluminum, and titanium ranges from about 15 to 45 weight percent and wherein, on such basis, the amount of nickel ranges from about 10 to 40 weight percent, the amount of aluminum ranges from about 1 to 4 weight percent, and the amount of titanium ranges from about 0.5 to 4 weight percent, and the sum of aluminum and titanium ranging from about 2 to 5 weight percent, said alloy being defined by the polygonal region ABCD of FIG. 1 which is delimited by the polygonal course.

A (10 % Co; 25 % (Ni+Al+Ti); 65 1 % Fe) —
B (10 % Co; 45 % (Ni+Al+Ti); 45 % Fe) —
C (45 % Co; 30 % (Ni+Al+Ti);25 % Fe) —
D (45 % Co; 15 % (Ni+Al+Ti); 40 % Fe) — A, said alloy having been prepared by the steps of sequentially a. melt fusing the starting metals at temperatures ranging from about 1500° to 1560° C.,
b. preliminarily annealing said alloy at temperatures ranging from about 700° to 900° C.,
c. cold deforming said alloy by at least about 70%, and
d. finally annealing said so deformed alloy at temperatures from about 500° to 700° for a time of from about 1 to 3 hours.

2. The alloy of claim 1 wherein said preliminary annealing is conducted in a time ranging from about 1 to 3 hours.

3. The alloy of claim 1 wherein on a 100 weight percent basis the amount of cobalt ranges from about 15 to 42 weight percent, the amount of iron ranges from about 34 to 55 weight percent, and the total amount of nickel, aluminum and titanium ranges from about 19 to 35 weight percent, and wherein on such basis the amount of nickel ranges from about 15 to 31 weight percent, the amount of aluminum ranges from about 1 to 3 weight percent, the amount of titanium ranges from about 1 to 3 weight percent, and the sum of aluminum and titanium ranges from about 3 to 4 weight percent, said alloy being defined by the polygonal region EFGH of FIG. 1 which is delimited by the polygonal course E (15 % Co; 30 % (Ni+Al+Ti); 55 % Fe) —
F (15 % Co; 35 % (Ni+Al+Ti); 50 % Fe) —
G (42 % Co; 24 % (Ni+Al+Ti); 34 % Fe) —
H (42 % Co; 19 % (Ni+Al+39 % Fe) — E.

4. An alloy of claim 1 in the physical form of a cross-sectionally generally circular wire having a diameter ranging from about 0.1 to 20 mm.

5. An alloy of claim 1 in the physical form of a cross-sectionally generally circular wire having a diameter ranging from about 0.2 to 5 mm.

* * * * *